US008644153B2

(12) United States Patent
Popoviciu et al.

(10) Patent No.: US 8,644,153 B2
(45) Date of Patent: Feb. 4, 2014

(54) INFRASTRUCTURE FOR MEDIATION DEVICE TO MEDIATION DEVICE COMMUNICATION

(75) Inventors: Ciprian P. Popoviciu, Raleigh, NC (US); John M. Gavin, Raleigh, NC (US); William J. Wei, Raleigh, NC (US); Mohamed Khalid, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1028 days.

(21) Appl. No.: 11/831,305

(22) Filed: Jul. 31, 2007

(65) Prior Publication Data

US 2009/0034430 A1 Feb. 5, 2009

(51) Int. Cl.
*H04B 7/185* (2006.01)
(52) U.S. Cl.
USPC .......................................... 370/235; 370/229
(58) Field of Classification Search
USPC .......................................... 370/328; 380/262
See application file for complete search history.

(56) References Cited

U.S. PATENT DOCUMENTS

| | | | |
|---|---|---|---|
| 5,850,606 A * | 12/1998 | Bedingfield et al. | 455/439 |
| 5,913,161 A * | 6/1999 | Ozulkulu et al. | 455/405 |
| 5,937,345 A * | 8/1999 | McGowan et al. | 455/410 |
| 6,122,499 A * | 9/2000 | Magnusson | 455/405 |
| 6,577,865 B2 * | 6/2003 | Dikmen et al. | 455/433 |
| 7,006,508 B2 * | 2/2006 | Bondy et al. | 370/410 |
| 7,152,103 B1 | 12/2006 | Ryan | |
| 7,162,529 B2 * | 1/2007 | Morishige et al. | 709/230 |
| 7,231,218 B2 | 6/2007 | Diacakis | |
| 7,305,429 B2 * | 12/2007 | Borella | 709/203 |
| 7,305,474 B2 * | 12/2007 | Giaffreda et al. | 709/227 |
| 7,382,881 B2 | 6/2008 | Uusitalo | |
| 2001/0052081 A1 * | 12/2001 | McKibben et al. | 713/201 |
| 2002/0051518 A1 * | 5/2002 | Bondy et al. | 379/35 |
| 2002/0122412 A1 * | 9/2002 | Chen et al. | 370/349 |
| 2007/0274255 A1 * | 11/2007 | Hung et al. | 370/328 |
| 2008/0146252 A1 * | 6/2008 | Razdan et al. | 455/458 |
| 2008/0318556 A1 * | 12/2008 | Erol et al. | 455/414.1 |
| 2009/0111462 A1 * | 4/2009 | Krinsky et al. | 455/423 |

OTHER PUBLICATIONS

F. Baker, B. Foster, and C. Sharp, "Cisco Architecture for Lawful Intercept in IP Networks," Network Working Group, RFC 3924, The Internet Society, Oct. 2004.

* cited by examiner

*Primary Examiner* — John Blanton
*Assistant Examiner* — Jay P Patel
(74) *Attorney, Agent, or Firm* — P. Su (57) ABSTRACT

Methods and apparatus for providing a mediation device infrastructure that allows a mobile node to be tapped while roaming among and within service providers are disclosed. In one embodiment, a method includes determining when a node that is tapped by a first mediation device has moved from a first domain associated with the first mediation device into a second domain associated with a second mediation device. A first packet is sent to the second mediation device if the node has moved. The first packet provides an indication that the second mediation device is to tap the node. The method also includes opening a call data channel to the second mediation device, and receiving information from the second mediation device on the call data channel that is obtained by the second mediation device from the node. Finally, the method includes providing the information to the first mediation device.

22 Claims, 11 Drawing Sheets

INFRASTRUCTURE FOR MEDIATION DEVICE TO MEDIATION DEVICE COMMUNICATION

BACKGROUND OF THE INVENTION

The present invention relates generally to the legal or lawful intercept (LI) of communications associated with a mobile node.

A service provider generally provides services to its subscribers, which may generally include mobile nodes. The services may include, but are not limited to including, provisions for allowing subscribers to gain access to networks in order to exchange information, e.g., with other nodes which have access to the networks. The information is typically exchanged as electronic mail, text, graphics, images, web pages, files and the like.

In addition to providing services to subscribers, a service provider also often provides various services to Law Enforcement Agencies (LEAs) in order to accommodate law enforcement. LI capabilities are often included in the services provided to the LEAs, and allow communications transferred to and from target nodes in a network to be lawfully monitored. A target node is typically any node that is under surveillance. In LI arrangements, a service provider may configure a mediation device to administer the tapping of the communications, e.g., surveillance. When a mobile node under surveillance accesses its home service provider network, i.e., the service provider network to which the mobile node is subscribed, the mediation device within whose domain the mobile node is in establishes a tap of communications to and from the mobile node. After obtaining information, as for example packets of data, from the mobile node, the mediation device then forwards the information to the LEA that requested the tap.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

In one embodiment, a method includes determining when a node that is tapped by a first mediation device has moved from a first domain associated with the first mediation device into a second domain associated with a second mediation device. A first packet is sent to the second mediation device when it is determined that the node has moved. The first packet provides an indication that the second mediation device is to tap the node. The method also includes opening a call data channel to the second mediation device, and receiving information from the second mediation device on the call data channel that is obtained by the second mediation device from the node. Finally, the method includes providing the information to the first mediation device.

Description

An infrastructure or framework which allows service providers to dynamically apply taps at the current location of a monitored subscriber, e.g., target mobile node, regardless of whether the monitored subscriber is within the domain of the service provider it is subscribed to or the domain of any other service provider enables law enforcement agencies (LEAs) to efficiently tap the monitored subscriber. It should be appreciated that although a subscriber is may be an entity or an individual who owns a computing device such as a mobile node, for ease of discussion, a subscriber will be referred to as the device or node itself. An infrastructure that supports dynamically applied taps allows a mobile node to be monitored for legal intercept purposes as it moves within its home service provider network, and also as it moves into the domain of a different service provider network. Hence, an LEA such as the Federal Bureau of Investigation (FBI) or the Drug Enforcement Agency (DEA) may continue to obtain information from a mobile node that is monitored by a mediation device in a first service provider network even if the mobile node moves out of the domain serviced by the mediation device.

In one embodiment, an architecture that allows a tap to be dynamically applied to a subscribing mobile node by a mediation device of a first service provider network enables the first service provider network to request that a different mediation device tap the mobile node if the mobile node moves into the domain of the different mediation device. The architecture also provides a backbone or signaling infrastructure which allows the first service provider to request a tap for the mobile device from another service provider within whose domain the mobile device has entered.

Figure 1:
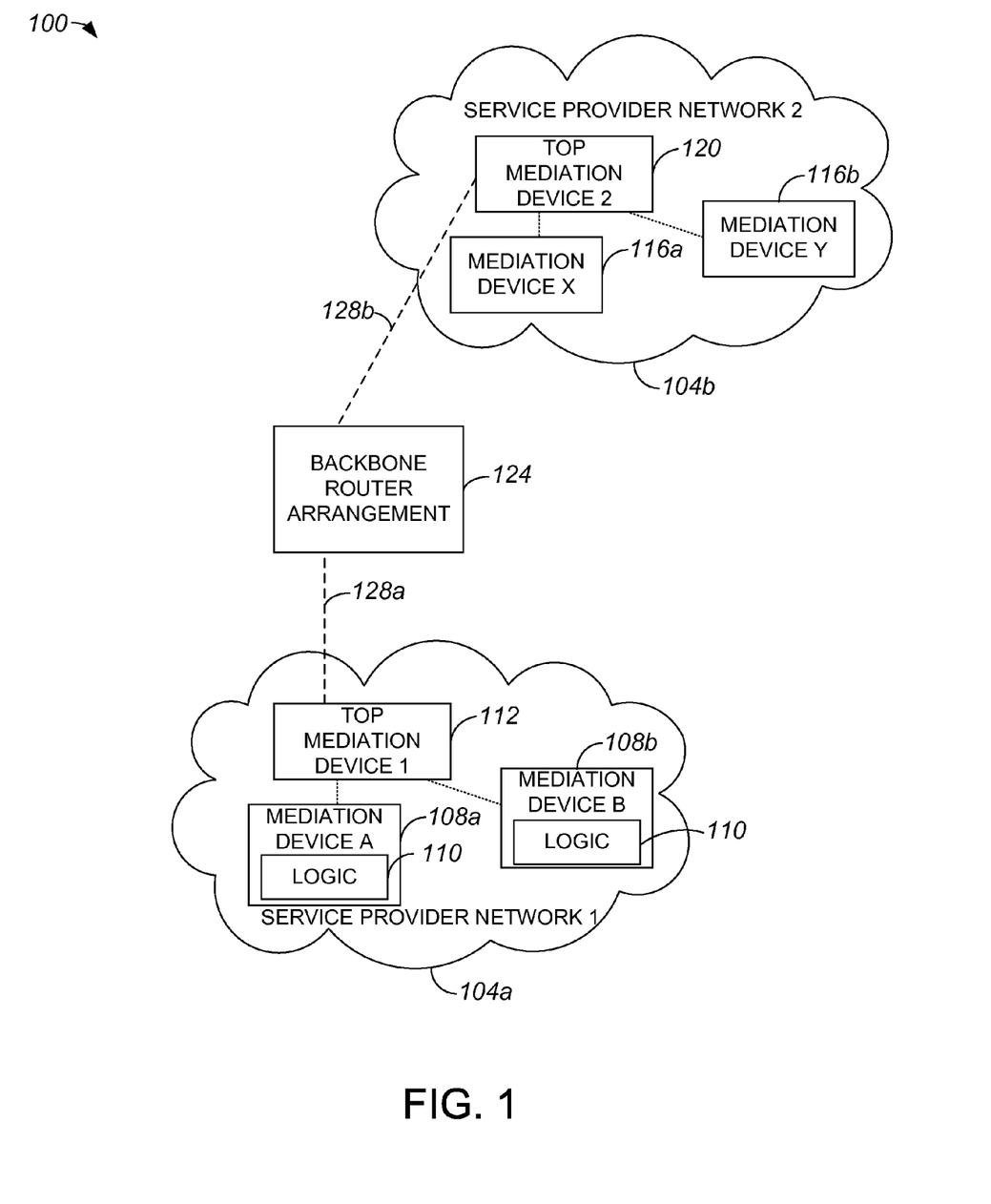
FIG. 1 is a block diagram representation of a tiered framework or infrastructure in accordance with an embodiment of the present invention.

An infrastructure may be such that each service provider network is dual-tiered. Each service provider includes mediation devices which each support a domain within the service provider. Further, each service provider has a top mediation device which communicates with substantially all mediation devices associated with the service provider, and also communicates with the top mediation devices of other service providers. As will be appreciated by those skilled in the art, although top mediation devices communicate with each other, the top mediation devices may or may not explicitly be aware of each other. Referring initially to FIG. 1, a tiered framework or infrastructure will be described in accordance with an embodiment of the present invention. A tiered framework 100 includes a plurality of service provider networks 104a, 104b and a backbone router arrangement 124.

A first service provider network 104a includes a plurality of mediation devices 108a, 108b that are in communication with each other via a first top mediation device 112. Mediation devices 108a, 108b and first top mediation device 112 may be computing devices that include processors, memory, and network cards. Mediation devices 108a, 108b include logic 110 that enables tapping of nodes (not shown) to occur, and enables packets to be generated. In one embodiment, first top mediation device 112 may be substantially the same as mediation devices 108a, 108b, and may be arranged to actually tap a mobile node (not shown). Alternatively, first top mediation device 112 may be substantially dedicated to facilitating communications between mediation devices 108a, 108b, as well as to communicating with backbone router arrangement 124, and may not actually tap a mobile node (not shown).

A second service provider network 104b includes a plurality of mediation devices 116a, 116b and a second top mediation device 120. Second top mediation device 120 facilitates communications with backbone router arrangement 124, and between mediation devices 116a, 116b.

Backbone router arrangement 124, which is generally owned by a trusted authority such as an LEA, is arranged to store information relating to static routes to service provider networks 104a, 104b. By way of example, backbone router arrangement 124 may store static routes for prefixes belonging to each service provider network 104a, 104b, and may effectively to point to corresponding top mediation devices 112, 120 over dedicated tunnels 128a, 128b, respectively. Ports (not shown) of router arrangement 124 and top mediation devices 112, 120 allow dedicated tunnels 128a, 128b to be established. Each top mediation device 112, 120 may connect to backbone router arrangement 124 over dedicated tunnels or circuits 128a, 128b, respectively, which may be encrypted. In one embodiment, dedicated tunnels 128a, 128b may be Internet Protocol Security (IPSec) tunnels.

Backbone router arrangement 124 may include a single router, or may include more than one router. When backbone router arrangement 124 includes more than one router, a first one of the routers may be configured as a primary router, while a second one of the routers may serve as a backup router to provide redundancy.

Top mediation device 112 is deployed to effectively manage mediation devices 108a, 108b, and functions as a control plane within first service provider network 104a. Top mediation device 112 effectively interfaces with second service provider network 104b, as well as other service provider networks (not shown), via backbone router arrangement 124 for LI purposes. For instance, top mediation device 112 may inform top mediation device 120 to tap a given mobile node (not shown). In addition, top mediation device 128a identifies substantially the best mediation device 108a, 108b to tap a given mobile node (not shown) if the mobile node is located within the zone serviced by within service provider network 104a. Within second service provider network 104b, top mediation device 120 performs substantially the same function as top mediation device 112.

Figure 2A:
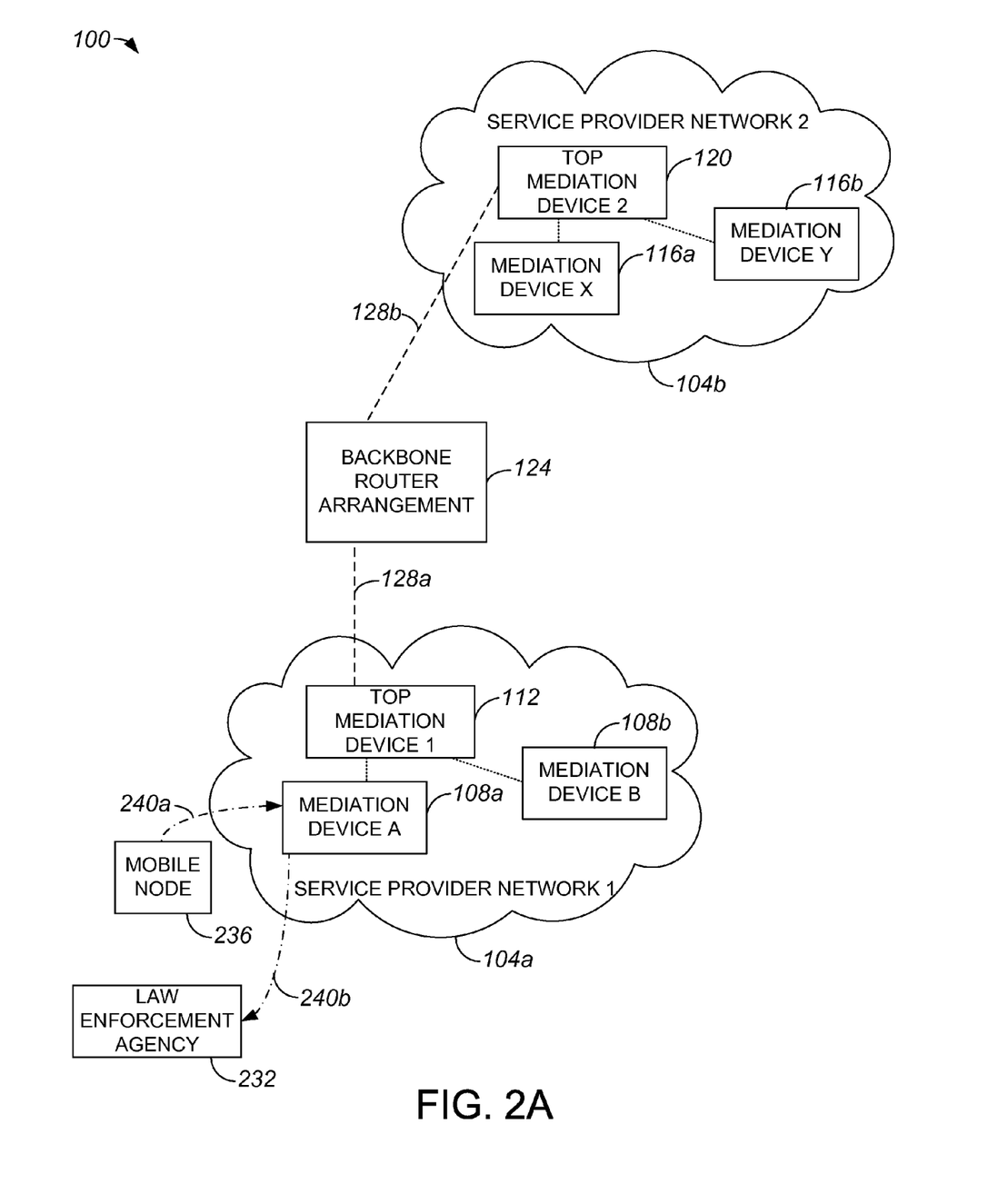
FIG. 2A is a block diagram representation of a tiered framework, e.g., tiered framework 100 of FIG. 1, in which a law enforcement agency (LEA) intercepts information from a mobile node through a mediation device associated with a first service provider network in accordance with an embodiment of the present invention.

When an LEA serves a warrant on, or otherwise informs, first service provider network 104b that one of the subscribers registered with first service provider network 104b is to be tapped or otherwise monitored, first top mediation device 112 may arrange for to tap the target, i.e., the subscriber of interest to the LEA. FIG. 2A is a representation of tiered framework 100 in which an LEA obtains information from a target mobile node located in a zone of first service provider network 104a in accordance with an embodiment of the present invention. An LEA 232 requests that a target mobile node 236 be tapped. Generally, mobile node 236 may be a computing device such as a laptop computer or a personal digital assistant.

In response to the request from LEA 232, first top mediation device 112 identifies an appropriate mediation device 108a, 108b to tap target mobile node 236. The appropriate mediation device 108a, 108b may the mediation device 108a, 108b within whose domain target mobile node 236 is currently located. As shown, mediation device 108a taps target mobile node 23. When target mobile node 236 is tapped or otherwise monitored by mediation device 108a, mediation device 108a obtains information from target mobile node 236, and forwards the information to LEA 232 or, more specifically, a receiving port associated with LEA 232. That is, a path taken by information, e.g., packets, obtained from mobile node 236 includes a segment 240a between target mobile node 236 and mediation device 108a, and a segment 240b between mediation device 108a and LEA 232. It should be appreciated that the information that is obtained may be data that target node 236 is either transmitting or receiving. Mediation device 108a and LEA 232 include ports that allow information to be forwarded and received.

When target mobile node 236 leaves the overall zone covered by first service provider network 104a, and moves into the overall zone covered by second service provider network 104b, top mediation device 112 will ascertain that target mobile node 236 is in the overall zone covered by second service provider network 104b, as will be discussed below with respect to FIG. 3A. Once top mediation device 112 effectively ascertains that target mobile node 236 is currently in the overall zone covered by second service provider network 104b, top mediation device 112 will notify top mediation device 120 that target mobile node 236 needs to be tapped within second service provider network 104b. Top mediation device 112 is typically unaware of exactly which service provider network target mobile node 236 is effectively connected to. Instead, top mediation device 112 determines that target mobile node 236 has moved outside its domain, and sends information to backbone router arrangement 124 which knows to send the information to top mediation device 120. That is, top mediation device 112 sends the information to the care-of address (COA) of target mobile node 236, and backbone router arrangement 124 forwards the information to top mediation device 120.

Figure 2B:
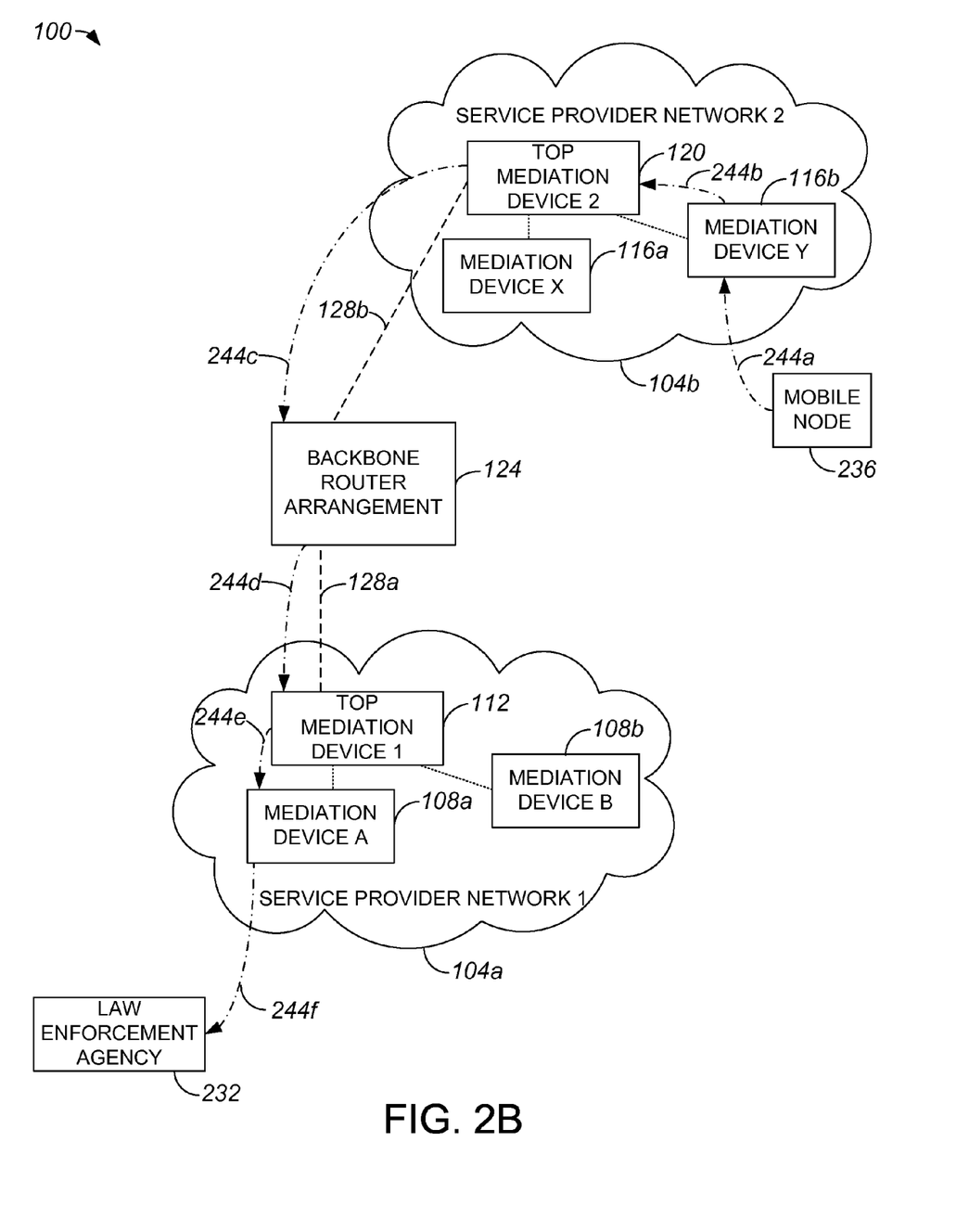
FIG. 2B is a block diagram representation of a tiered framework, e.g., tiered framework 100 of FIG. 1, in which an LEA obtains information from a mobile node through mediation devices associated with more than one service provider network in accordance with an embodiment of the present invention.

FIG. 2B is a block diagram representation of tiered framework 100 of FIGS. 1 and 2A in which LEA 232 obtains information from a target mobile node 236 when target mobile node 236 is located within an overall zone of second service provider network 104b in accordance with an embodiment of the present invention. When top mediation device 120 receives notification that it should tap target mobile node 236, top mediation device 120 determines which mediation device 116a, 116b is suitable for tapping or otherwise monitoring target mobile node 236. In the described embodiment, mediation device 116b is identified as being suitable to tap target mobile node 236.

After target mobile node 236 is tapped by mediation device 116b, information obtained from mediation device 116b may be communicated to LEA 232. A path over which the information may be communicated includes a first segment 244a between target mobile node 236 and mediation device 116b, and a second segment 244b between mediation device 116b and top mediation device 120. The path also includes a third segment 244c between top mediation device 120 and backbone router arrangement 124, and a fourth segment 244d from backbone router arrangement 124 to top mediation device 112. Finally, the path over which information is provided to LEA 232 also includes a segment 244e between top mediation device 112 and mediation device 108a, and a final segment 244f between mediation device 108a and LEA 232. It should be appreciated that LEA 232 is unaware of the path over which the information is provided, i.e., the process of providing information to LEA 232 is effectively transparent to LEA 232.

Figure 3A:
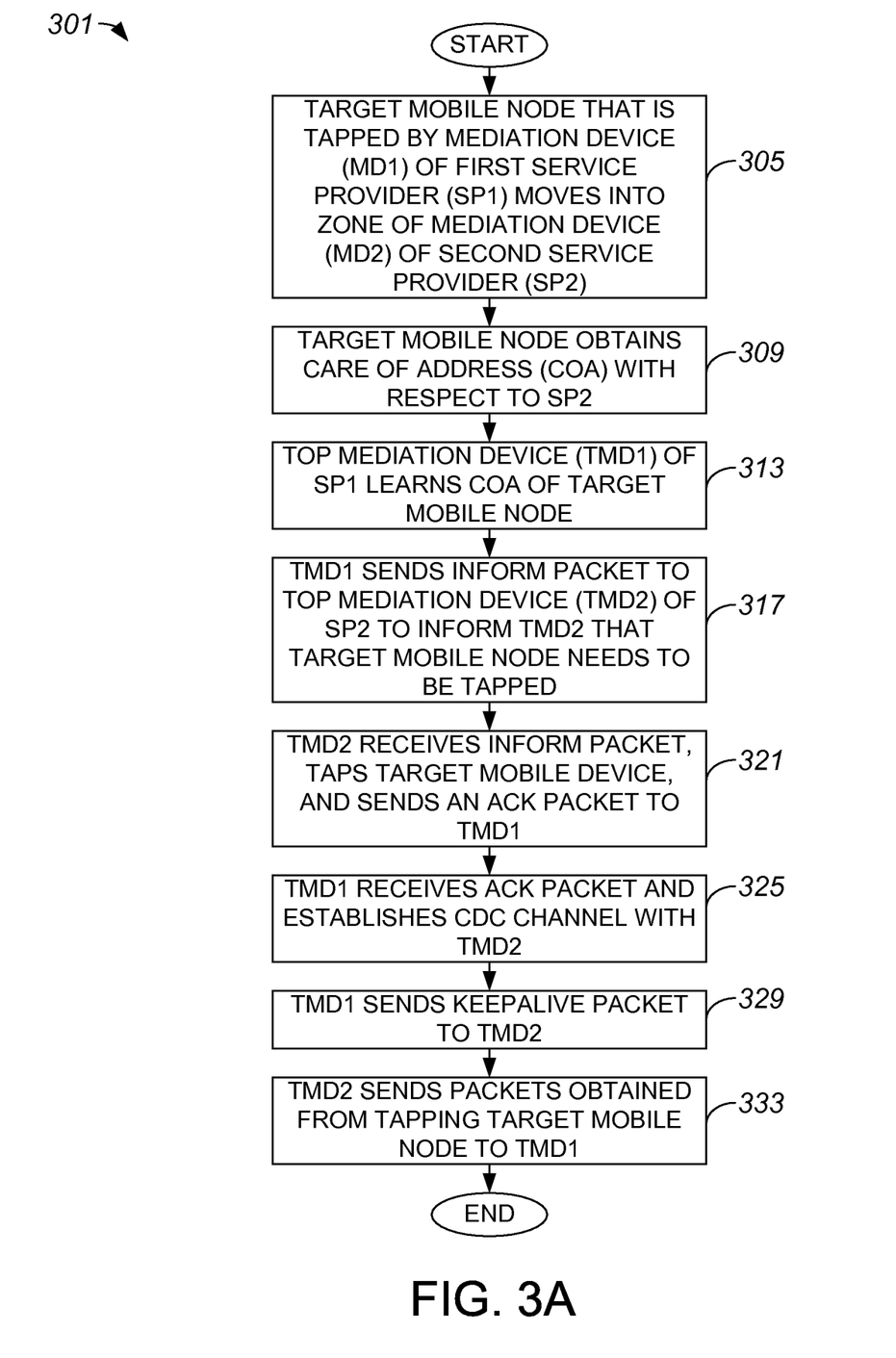
FIG. 3A is a process flow diagram which illustrates a communications flow between top mediation devices of different service provider networks in accordance with an embodiment of the present invention.

With reference to FIG. 3A, a method of communicating between a top mediation device of one service provider and a top mediation device of another service provider will be described in accordance with an embodiment of the present invention. A process 301 begins at step 305 in which a target mobile node that is already tapped by a first mediation device (MD1) associated with a first service provider (SP1) moves into a zone that is serviced by a second mediation device (MD2) associated with a second service provider (SP2). The target mobile node effectively leaves one zone, e.g., the zone serviced by SP1, and enters into the zone serviced by SP2.

After the target mobile node enters into the zone serviced by SP2 and, more specifically, MD2, the target mobile node obtains a COA with respect to SP2 in step 309. As will be appreciated by those skilled in the art, a COA is acquired by the target mobile node from SP2. Once the target mobile node obtains a COA, a first top mediation device (TMD1) of SP1 learns the COA of the target mobile node in step 313. TMD1 may learn the COA of the target mobile node when the target mobile node registers the COA with a home agent. Substantially any suitable method may be used by TMD1 to ascertain the COA of the target mobile node. Suitable methods include, but are not limited to including, those discussed in co-pending U.S. patent application Ser. No. 11/765,094, entitled "MANAGING MOBILE NODES IN A LAWFUL INTERCEPT ARCHITECTURE," filed Jun. 19, 2007, which is incorporated herein by reference in its entirety.

From step 313, process flow moves to step 317 in which TMD1 sends an inform packet directly or indirectly to a second top mediation device (TMD2) of SP2. It should be appreciated that while TMD1 communicates with TMD2, TMD1 may not explicitly know of the existence of TMD2. The inform packet is a message that effectively indicates that the target mobile node is to be tapped by SP2. The inform packet generally includes an indication that a communications session between TMD1 and TMD2 is desired. One embodiment of an inform packet will be described below with respect to FIG. 4A.

In the described embodiment, upon receiving the inform packet from TMD1, TMD2 initiates a tapping process within the domain of SP2 with respect to the target mobile device, and sends an acknowledgement (ACK) packet in step 321 to TMD1. Then, in step 325, TMD1 receives the ACK packet and establishes a call data channel (CDC) channel with TMD2. Establishing the CDC channel may include binding a call content channel identifier (CCID) of TMD1 with a CCID of TMD2. It should be understood that although an ACK packet is assumed to be sent in step 321, in the event that TMD2 does not send an ACK packet, as for example if the inform packet is not received, TMD1 may inform the appropriate LEA that no response was received from TMD2.

Once TMD1 establishes a CDC channel with TMD2, TMD1 sends a keepalive packet to TMD2 in step 329. A keepalive packet, which will be discussed below with respect to FIG. 4B, may be sent periodically to TMD2 to indicate to TMD1 that the link with TMD2 is functional. A keepalive packet is generally used to differentiate between TMD1 not receiving tapped traffic because a target mobile node is not communication and not receiving tapped traffic because there is a problem on the delivery path for the tapped traffic.

After the keepalive packet is sent to TMD2, TMD2 sends packets obtained from tapping the target mobile node in step 329. Substantially any mediation device within SP2 may tap the target mobile node. In one embodiment, TMD2 sends packets obtained from the target mobile node, as for example through a second mediation device (MD2) in SP2, on the CDC channel to TMD1. The process of communicating between top mediation devices is completed upon TMD2 sending information that is obtained from the target mobile node to TMD1 via the CDC channel.

In general, a target mobile node may move from service provider to service provider relatively often. Hence, a target mobile node that is in a zone serviced by TMD2 may move out of the domain of SP2 to yet another domain, e.g., the domain of a third service provider (SP3). When a target mobile node moves out of the domain of SP2, the host service provider, e.g., SP1 or the service provider with which the target mobile node has a HOA, informs SP2 that SP2 no longer has to tap the target mobile node.

Figure 3B:
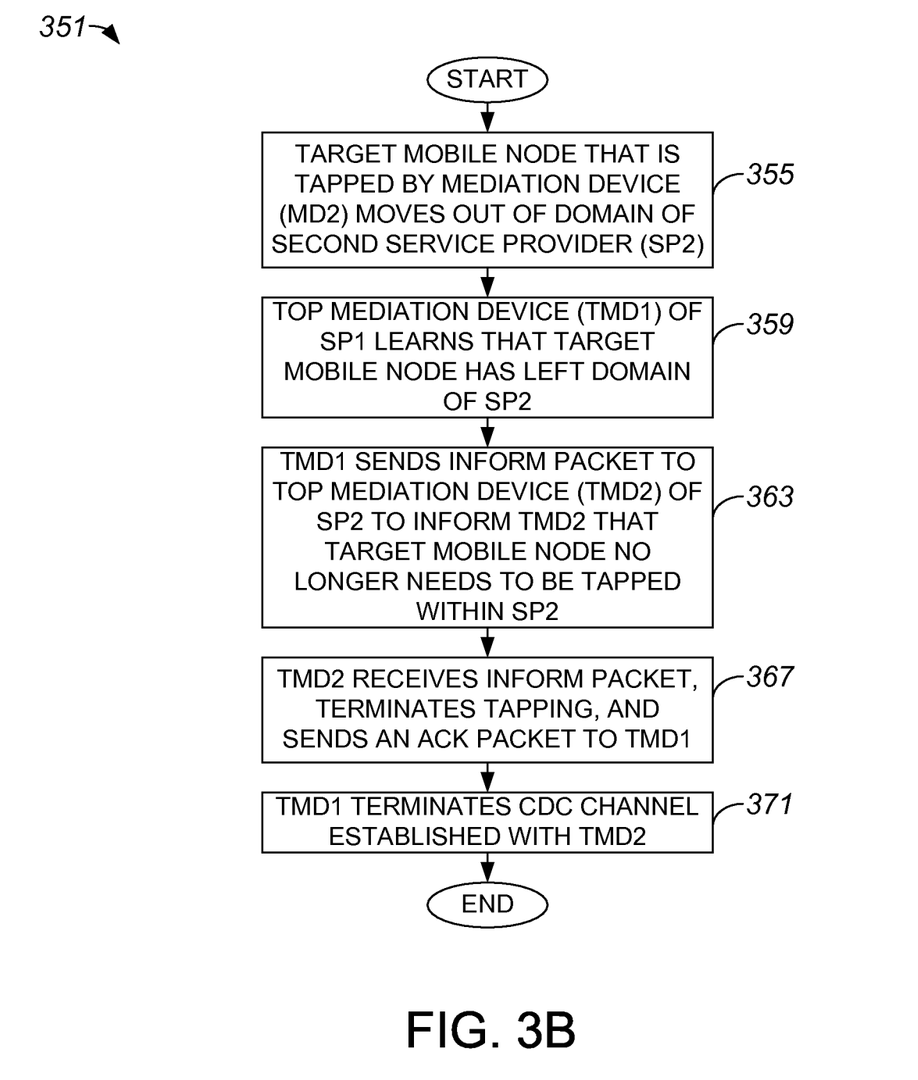
FIG. 3B is a process flow diagram which illustrates a process of terminating a communications flow between top mediation devices of different service provider networks in accordance with an embodiment of the present invention.

FIG. 3B is a process flow diagram which illustrates a process of terminating a communications flow between top mediation devices of different service provider networks in accordance with an embodiment of the present invention. A process 351 of terminating a communications flow between TMD1 and TMD2 begins at step 355 when the target mobile node leaves the domain of SP2. In the described embodiment, the target mobile node was tapped by MD2 in SP2, and has left the domain of SP2.

In step 359, TMD1 of SP1 becomes aware that the target mobile node has left the domain of SP2. TMD1 may determine that the target mobile node has left the domain of SP2 by detecting that the COA of the target mobile node has changed. Although the COA of the target mobile node may also change but be within the domain of SP2, in the described embodiment, the target mobile node leaves the domain of SP2. It should be appreciated, however, that if the target mobile node changes its COA but is still within the domain of SP2, TMD1 may set up a new session associated with the new location for the target mobile node. Once TMD1 learns that the target mobile node has left the domain of the second service provider, TMD1 sends an inform packet to TMD2 in step 363. The inform packet is arranged to indicate that a communications session between TMD1 and TMD2 may be terminated. In general, the inform packet is arranged to inform TMD2 that the target mobile node no longer needs to be tapped within SP2.

After TMD1 sends the inform packet to TMD2, TMD2 terminates the tapping of the target mobile node within SP2 in step 367, and sends an ACK packet to TMD1. The ACK packet is intended to indicate that TMD2 has received the information that the target mobile node no longer needs to be tapped within SP2, and will cease tapping the target mobile node. Upon receiving the ACK packet, or after a predetermined time period has elapsed without receiving an ACK packet, TMD1 terminates the CDC channel established with TMD2, and the process of terminating a communications flow is completed.

Messages sent between the top mediation devices of different service providers may have any suitable format. One example of an inform packet that is sent by a top mediation device associated with an original host service provider, e.g., TMD1 as described above with respect to FIGS. 3A and 3B, to a top mediation device associated with another service provider, e.g., TMD2 as described above with respect to FIGS. 3A and 3B, will be described with respect to FIG. 4A in accordance with an embodiment of the present invention. An inform packet 450 is generally arranged to be sent by a top mediation device of an original service provider, i.e., the service provider that originally taps a target mobile node, to a top mediation device of a new or different service provider, i.e., the service provider into whose domain the target mobile node entered. Inform packet 450 includes a payload 454 that contains information intended to be read by a recipient.

Figure 4A:
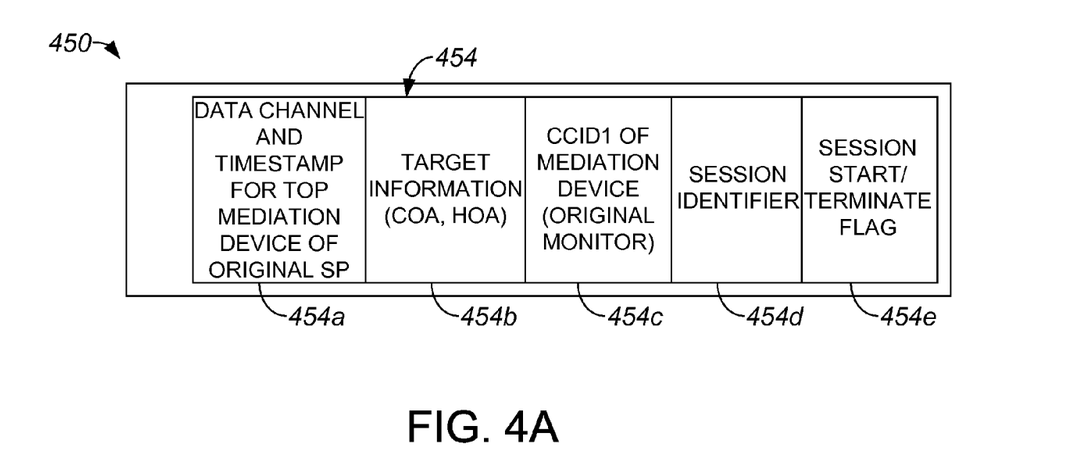
FIG. 4A is a diagrammatic representation of an inform packet that is suitable for being transmitted between service provider networks in accordance with an embodiment of the present invention.

Payload 454 includes information 454a that may effectively identify the original mediation device that was monitoring, e.g., maintaining a tap on, the target mobile node. Information 454a, in one embodiment, identifies a data channel for the top mediation device or the original service provider, or an IP/CDC port for the original top mediation device. Information 454a may also include a timestamp that indicates when the inform packet was created, e.g., when the request to tap was sent Target information 454b included in payload 454 identifies the COA of the target mobile device, or the address assigned to the target mobile device by the service provider associated with the recipient of inform packet 450. The HOA of the target mobile device is also included in target information 454b. It should be appreciated that as the COA and the HOA of the target mobile device are generally included in a header (not shown) of inform packet 450, payload 454 may not necessarily include target information 454b.

Payload 454 also includes the CCID 454c of the mediation device, and a session identifier 454d. Session identifier 454d identifies a session, e.g., a tapping session, associated with the top mediation device of the original service provider desires and the top mediation device of the new service provider. Session identifier 454d may either identify a session that is effectively to be initiated, or a session that is effectively to be terminated. A session start/terminate flag 454e is arranged to be set to indicate whether the session identified by session identifier 454d is to be initiated or terminated.

Figure 4B:
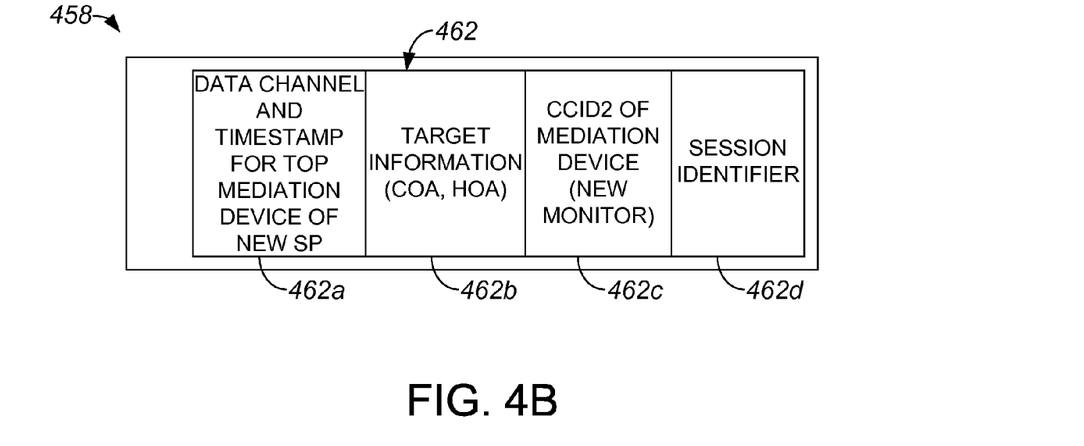
FIG. 4B is a diagrammatic representation of an acknowledgement (ACK) packet that is suitable for being transmitted between service provider networks in accordance with an embodiment of the present invention.

FIG. 4B is a diagrammatic representation of an ACK packet that is suitable for being transmitted between a new service provider to an original service provider in accordance with an embodiment of the present invention. An ACK packet 458 may be sent by a new service provider, e.g., a service provider into whose domain a target mobile node has entered, to an original service provider, e.g., the service provider which originally tapped the target mobile node, to acknowledge the receipt of an inform packet.

ACK packet 458 includes a payload 462 which contains information 462a that identifies a data channel for the top mediation device of the new service provider, or the IP/CDC port of the new top mediation device. Information 462a may also include a timestamp that indicates a time at which ACK packet 458 was created. In one embodiment, the timestamp may effectively signal the start of tapping in the new domain, i.e., the domain of the new service provider.

Target information 462b, which identifies the COA and the HOA of a target mobile node, is provided in payload 462. The CCID 462c of the mediation device that will effectively monitor the target mobile node within the domain of the new service provider, as well as a session identifier 462d, are also included in payload 462.

Figure 4C:
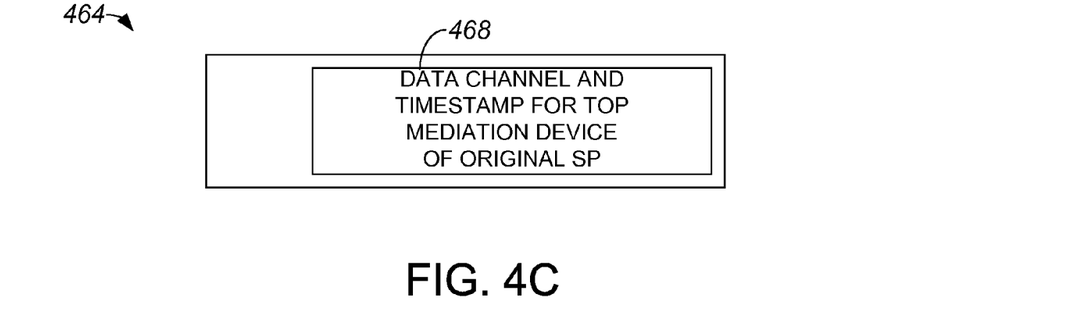
FIG. 4C is a diagrammatic representation of a keepalive packet that is suitable for being transmitted between service provider networks in accordance with an embodiment of the present invention.

FIG. 4C is a diagrammatic representation of a keepalive packet that is suitable for being transmitted from an original service provider network to a new service provider network in accordance with an embodiment of the present invention. A keepalive packet 464 is arranged to inform a new service provider maintain a session state associated with the data channel on which tapping information is being shared even in the event of a break in communication. Keepalive packet 464 includes a payload 468 that contains information regarding the data channel that is used to share tapping information, as well as a timestamp that indicates a time at which keepalive packet 464 was created. As previously mentioned, keepalive packet 464 may be sent periodically, e.g., at predetermined intervals. By way of example, if no other messages are exchanged within a particular interval of time, keepalive packet 464 may be sent.

Once a top mediation device of an original service provider indicates to a top mediation device of a new service provider that a target mobile node within the domain of the new service provider should be tapped or otherwise monitored, a mediation device within the network of the new service provider taps the target mobile node. Upon tapping the target mobile node, the mediation device of the new service provider may capture data from the target mobile node and essentially pass the data to the original mediation device.

Figure 5:
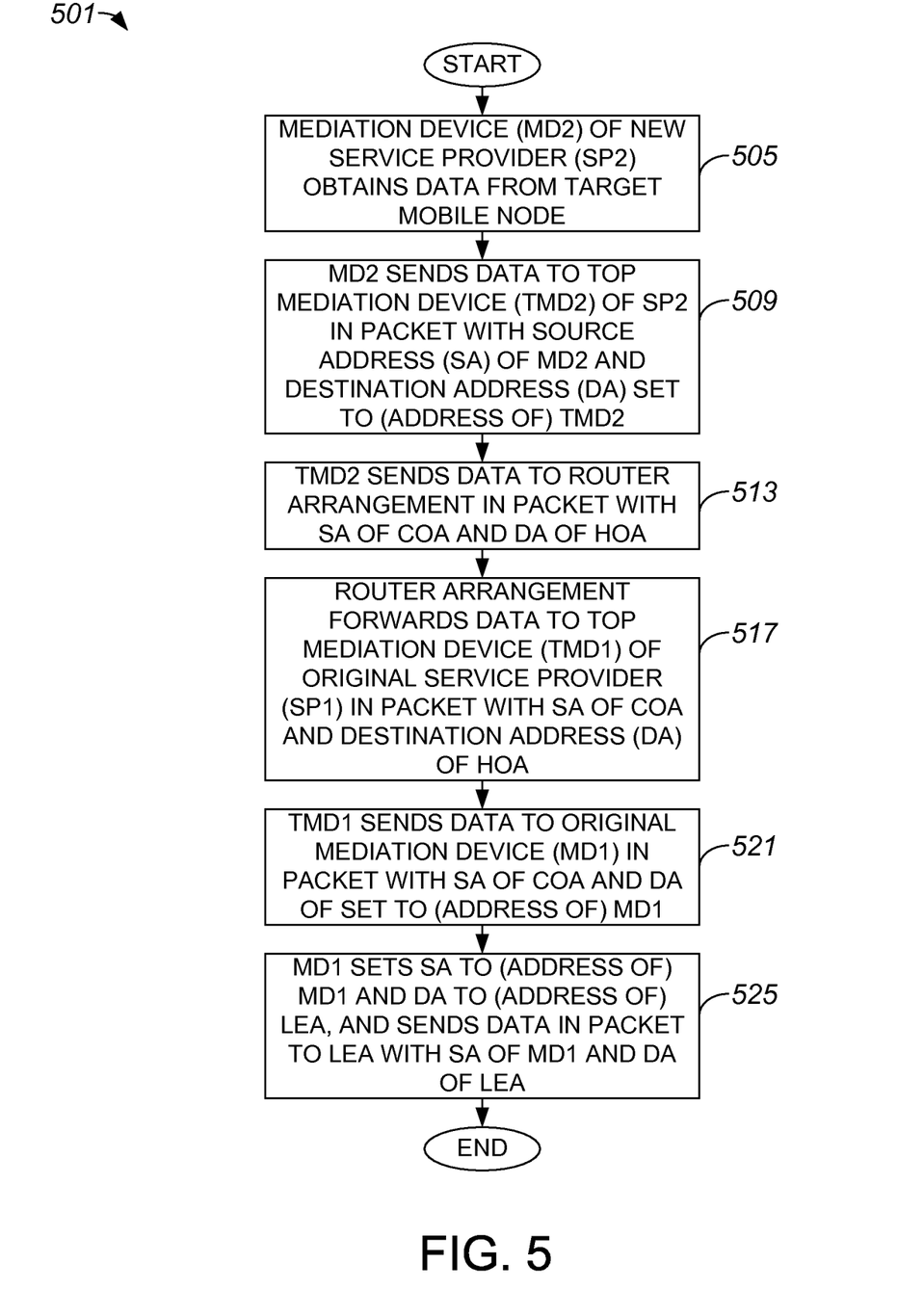
FIG. 5 is a process flow diagram which illustrates a flow of data from a target with a home address (HOA) in one service provider and a care-of address (COA) in another service provider in accordance with an embodiment of the present invention.

Referring next to FIG. 5, the flow of data captured from a target mobile device will be described in accordance with an embodiment of the present invention. A process 501 of transmitting data obtained from a target mobile node by a new mediation device to an original mediation device begins at step 505 in which the new mediation device (MD2), e.g., the mediation device of the new service provider (SP2), obtains a packet of data from the target mobile node. Once MD2 obtains the data from the target mobile node, MD2 sends a packet to the top mediation device (TMD2) of SP2 in step 509. The packet sent by MD2 contains the data obtained from the target mobile node, and has a source address (SA) that is the address of MD2 and a destination address (DA) that is the address of TMD2.

After MD2 sends a packet containing data obtained from the target mobile device to TMD2, TMD2 transmits the data to a router arrangement in step 513. In the described embodiment, TMD2 creates a packet that includes the data, specifies a SA that is the COA of the target mobile node, and specifies a DA that is the HOA of the target mobile node.

In step 517, after the router arrangement receives the packet from TMD2 that contains data obtained from the target mobile node, the router arrangement forwards the data to the top mediation device (TMD1) of the original service provider (SP1). The router arrangement forwards a packet that contains the data to TMD1 with a SA that is the COA of the target mobile node and a DA that is the HOA of the target node. Typically, the router arrangement may forward the packet substantially as received from TMD2.

From step 517, process flow moves to step 521 in which TMD1 receives the data from the router arrangement, and sends a packet that contains the data to the original mediation device (MD1) that tapped or otherwise monitored the target mobile node. The packet sent by TMD1 to MD1 specifies an SA that is the COA of the target mobile node and a DA that is set to the address of MD1. Once MD1 receives the packet from TMD1, MD1 sends the data to the LEA in step 525, i.e., the LEA that was originally monitoring the target mobile node, in a packet that specifies the address of MD1 as a SA and the address of LEA as the DA. After the data is sent to the LEA, the process of transmitting data obtained from a target mobile node is completed.

As previously mentioned, while a target mobile node may move between service provider networks, a target mobile node may also move within a service provider network. That is, target mobile node may move while tapped from the domain of one mediation device in a service provider network into the domain of a different mediation device in the same service provider network. Hence, an LEA may continue to obtain information from the same service provider while the target mobile node moves within the service provider network.

Figure 6:
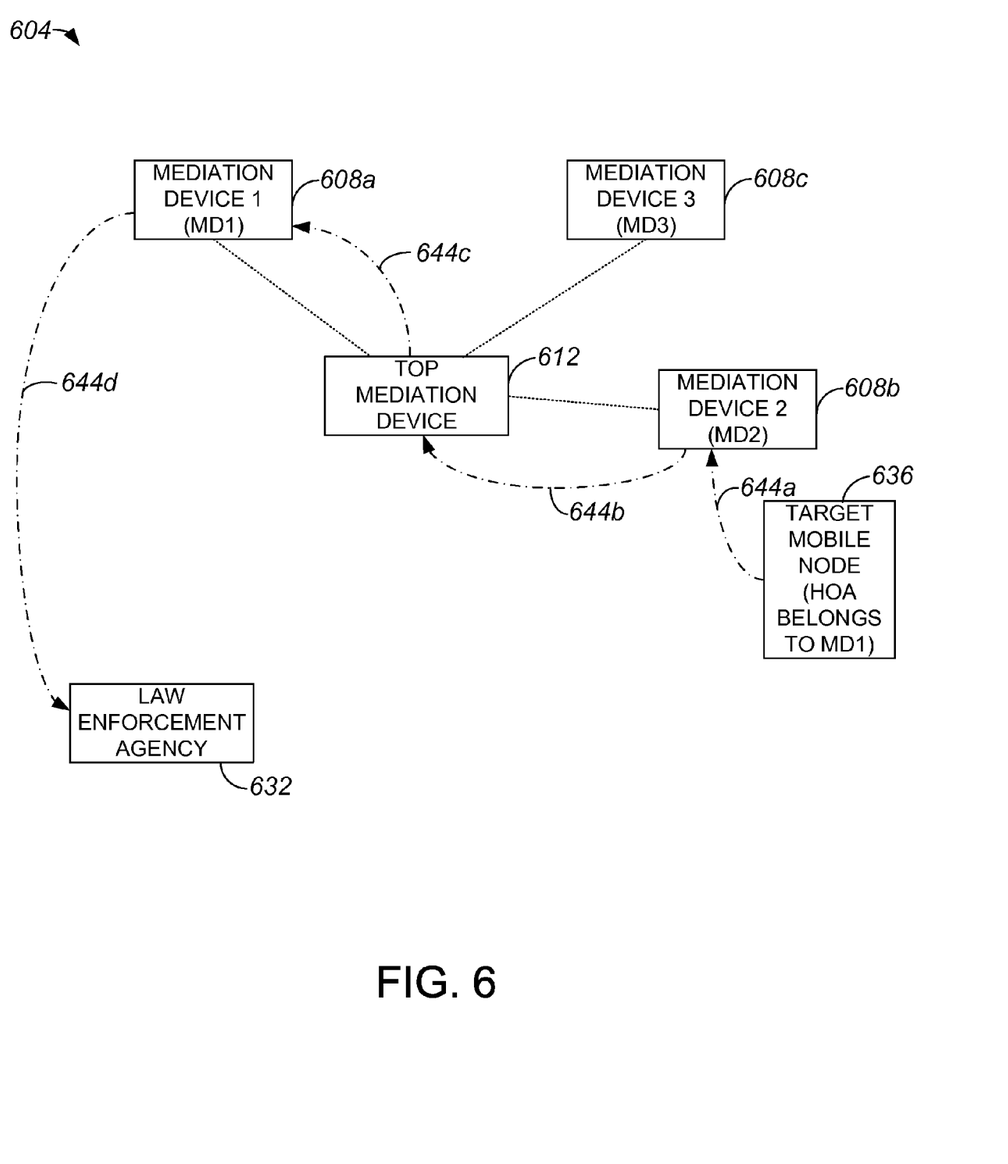
FIG. 6 is a block diagram representation of an LEA obtaining information from a target node substantially through a single service provider in accordance with an embodiment of the present invention.

FIG. 6 is a block diagram representation of an LEA obtaining information from a target node substantially through a single service provider in accordance with an embodiment of the present invention. An LEA 632 has a warrant to tap a target mobile node 636 which is subscribed to a service provider network 604 that includes multiple mediation devices 608a-c and a top mediation device 612. In one embodiment, target mobile node 636 has a HOA that is under the jurisdiction of a first mediation device (MD1) 608a. MD1 608a initiated a tap on target mobile node 636, but target mobile node 636 has moved into a domain associated with a second mediation device (MD2) 608b, where target mobile node 636 may have a COA that is associated with MD2 608b.

Top mediation device 612 is configured to facilitate communications between mediation devices 608a-c. In general, top mediation device 612 is aware of which mediation device 608a-c is responsible for a particular domain, or internet protocol (IP) space. By way of example, when target mobile node 636 moves from the domain associated with MD1 608a to the domain associated with MD2 608b, top mediation device 612 may determine the current location of target mobile node 636, and inform MD2 608b to tap target mobile node 636. Top mediation device 612 may also forward information obtained by MD2 608b form target mobile node 636 to MD1 608a.

Information obtained by tapping target mobile node 636 is communicated to LEA 632 via a path. The path includes a first segment 644a between target mobile node 636 and MD2 608b, a second segment 644b between MD2 608b and top mediation device 612, a third segment between top mediation device 612 and MD1 608a, and a fourth segment between MD1 608a and LEA 632.

Figure 7A:
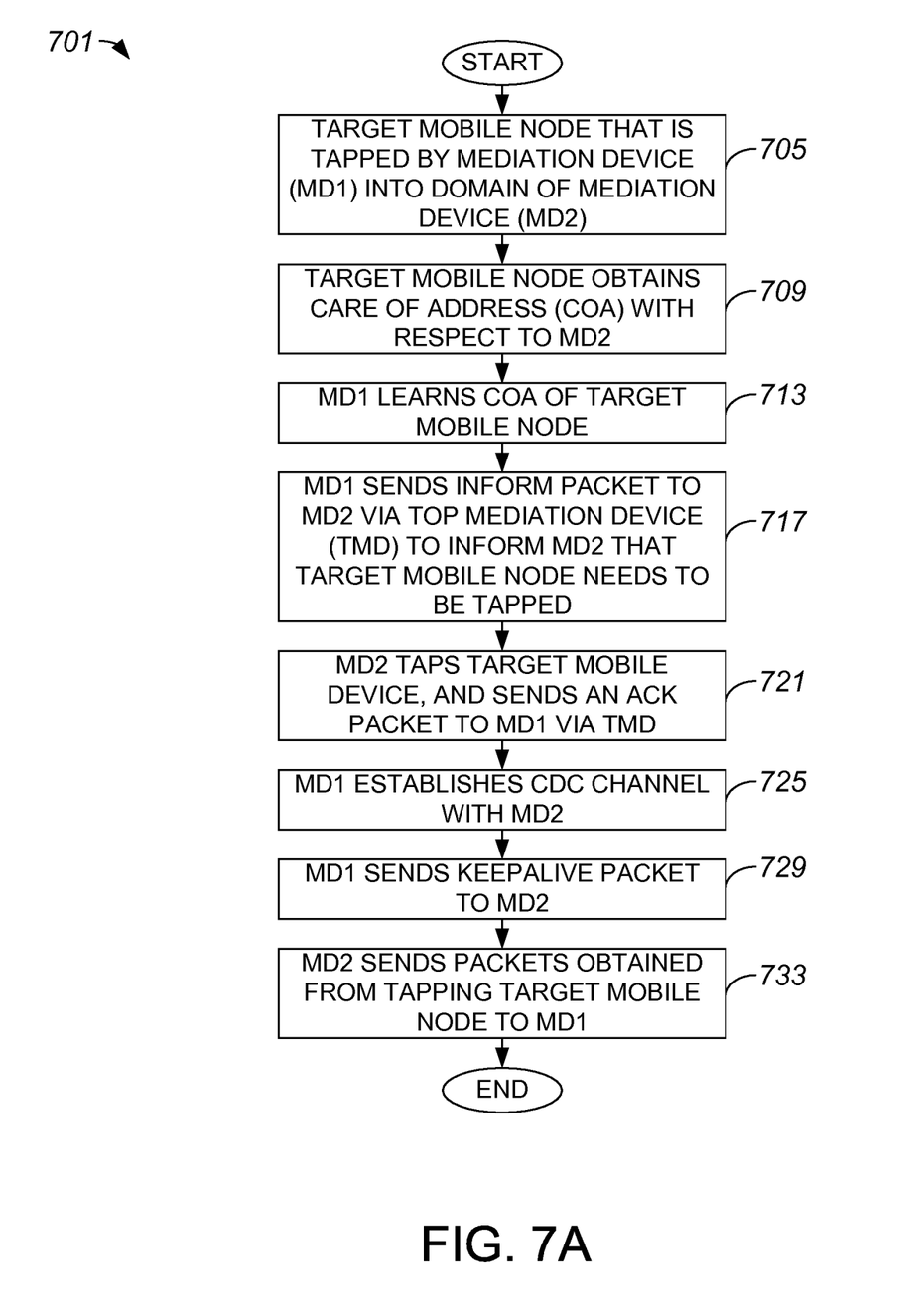
FIG. 7A is a process flow diagram of a communications flow between mediation devices in a single service provider network in accordance with an embodiment of the present invention.

With reference to FIG. 7A, a communications flow between mediation devices in a single service provider network will be described in accordance with an embodiment of the present invention. A process 701 of communicating intra-network relative to a service provider network begins at step 705 in which a target mobile node that is tapped by MD1 moves into the domain supported by MD2. In step 709, the target mobile node obtains a COA from MD2, while retaining its HOA, i.e., an HOA that is associated with MD1.

After the target mobile node obtains a COA, MD1 learns the COA of the target mobile node in step 713. Substantially any suitable method may be used by MD1 to learn the COA of the target mobile node. Suitable methods include, but are not limited to including, methods discussed in co-pending U.S. patent application Ser. No. 11/765,094, which is incorporated herein by reference in its entirety. From step 713, process flow proceeds to step 717 in which MD1 sends an inform packet to MD2 via a top mediation device to inform MD2 that the target mobile node is to be tapped by MD2. One example of an inform packet suitable for being sent within a service provider network will be described below with reference to FIG. 8A.

Once the inform packet is sent by MD1, MD2 receives the inform packet in step 721, and taps the target mobile device. At approximately the same time that the target mobile device is tapped by MD2, MD2 sends an ACK packet to MD1 via the top mediation device. An ACK packet that is configured to be sent within a service provider network will be discussed below with respect to FIG. 8B.

Upon receiving an ACK packet, MD1 establishes a CDC channel with MD2 in step 725. Then, in step 729, MD1 sends a keepalive packet to MD2, and MD2 sends packets obtained from the target mobile node to MD1 in step 733. One embodiment of a keepalive packet that is configured to be sent within a service provider network will be described below with reference to FIG. 8C. The packets obtained from tapping the target mobile node may be packets that are being transmitted or received by the target mobile node. The process of communicating intra-network is completed after MD2 sends packets obtained from tapping the target mobile node to MD1.

Figure 7B:
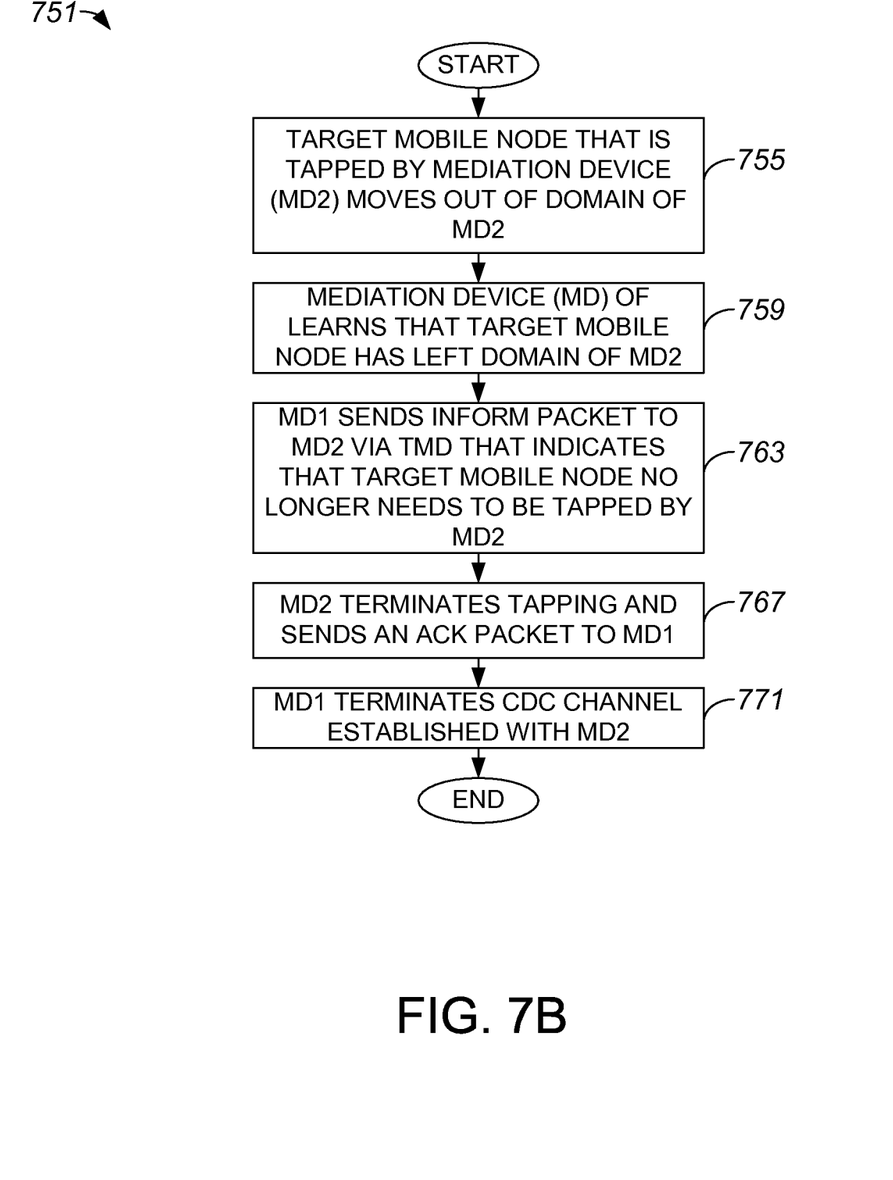
FIG. 7B is a process flow diagram which illustrates a process of terminating a communications flow between mediation devices in a single service provider network in accordance with an embodiment of the present invention.

A communications flow between MD1 and MD2 may continue substantially as long as the target mobile node remains in the domain of MD2, and remains active, e.g., continues to transmit and/or receive packets. The communications flow between MD1 and MD2 may generally be terminated if the target mobile node moves out of the domain of MD2. FIG. 7B is a process flow diagram which illustrates a process of terminating a communications flow between mediation devices in a single service provider network in accordance with an embodiment of the present invention. A process 751 of terminating a communications flow begins at step 755 in which the target mobile node that is tapped by MD2, and has a COA associated with MD2, moves out of the domain of MD2. In step 759, MD1, which originally tapped the target mobile node, becomes aware that the target mobile node has left the domain of MD2. In one embodiment, MD1 may obtain information regarding the location of the target node from a top mediation device in its service provider network, e.g., when the top mediation device receives a new COA for the target mobile node.

After MD1 learns that MD2 has left the domain of MD2, MD1 sends an inform packet to MD2 in step 763 via a top mediation device in the service provider network, i.e., the service provider network to which both MD1 and MD2 belong. The inform packet is arranged to indicate that MD2 no longer needs to tap MD2. Once MD2 receives the inform packet, MD2 terminates tapping of the target mobile node in step 767 and sends an ACK packet to MD1 to acknowledge that the inform packet was received. Then, in step 771, MD1 terminates the CDC channel established with MD2, and the process of terminating a communications flow is completed.

Figure 8A:
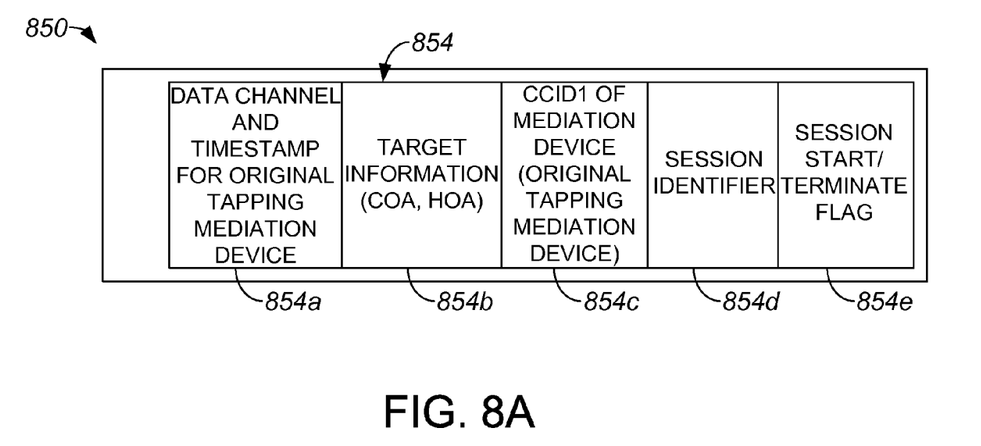
FIG. 8A is a diagrammatic representation of an inform packet that is suitable for being transmitted between mediation devices in a single service provider network in accordance with an embodiment of the present invention.

FIG. 8A is a diagrammatic representation of an inform packet that is suitable for being transmitted between mediation devices in a single service provider network in accordance with an embodiment of the present invention. An inform packet 850 is configured to be sent by one mediation device of service provider, i.e., the mediation device that originally taps a target mobile node, to another mediation device of the service provider, i.e., the mediation device that is to begin to tap the target mobile node. Inform packet 850 includes a payload 854 that contains information intended to be read by a recipient mediation device. Payload 854 includes information 854a that identifies the original mediation device that was monitoring, e.g., maintaining a tap on, the target mobile node. Information 854a may identify a data channel for the original mediation device or an IP/CDC port for the original mediation device. Information 854a may also include a timestamp that indicates when inform packet 850 was sent.

Payload 854 also includes target information 854b that identifies the COA and the HOA of the target mobile device. As the COA and the HOA of the target mobile device are generally included in a header (not shown) of inform packet 850, payload 854 may not necessarily include target information 854b. The CCID 854c of the original mediation device and a session identifier 854d may also be included in payload 854. Session identifier 854d identifies a session, e.g., a tapping session, that is effectively to be initiated, or a session that is effectively to be terminated. A session start/terminate flag 854e is arranged to be set to indicate whether the session identified by session identifier 854d is to be initiated or terminated.

Figure 8B:
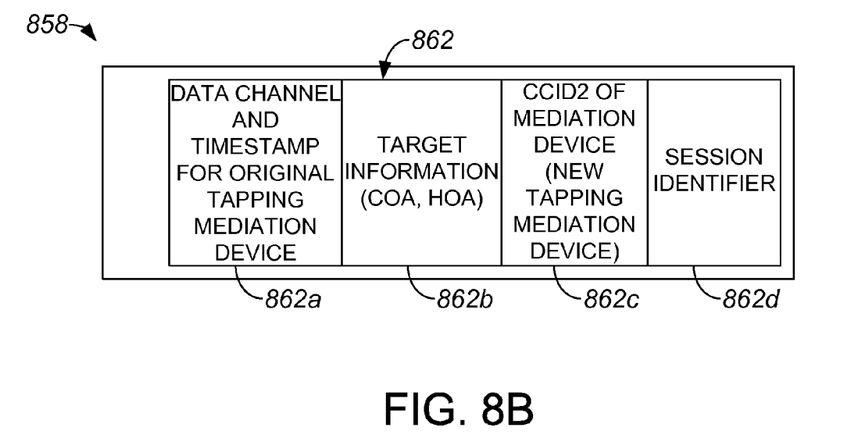
FIG. 8B is a diagrammatic representation of an ACK packet that is suitable for being transmitted between mediation devices in a single service provider network in accordance with an embodiment of the present invention.

FIG. 8B is a diagrammatic representation of an ACK packet that is suitable for being transmitted between mediation devices in a single service provider network in accordance with an embodiment of the present invention. An ACK packet 858 may be sent by a new mediation device, e.g., the mediation device that received an inform packet from an original mediation device, to the original mediation device. Typically, ACK packet 858 is arranged to acknowledge the receipt of an inform packet.

ACK packet 858 includes a payload 862 which contains information 862a that identifies a data channel for the original mediation device of the new service provider, or the IP/CDC port of the original mediation device. Information 862a may also include a timestamp that indicates a time at which ACK packet 858 was created and, hence, when tapping by the new mediation device commenced. Payload 862 also includes target information 862b which identifies the COA and the HOA of a target mobile node, as well as the CCID 462c of the new mediation device and a session identifier 462d.

Figure 8C:
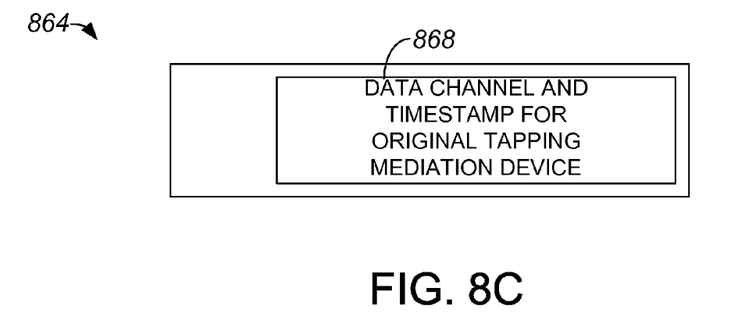
FIG. 8C is a diagrammatic representation of a keepalive packet that is suitable for being transmitted between mediation devices in a single service provider network in accordance with an embodiment of the present invention.

FIG. 8C is a diagrammatic representation of a keepalive packet that is suitable for being transmitted within a single service provider network in accordance with an embodiment of the present invention. A keepalive packet 864 is configured to inform a new mediation device to maintain a session state associated with the data channel on which tapping information is being shared. Keepalive packet 864 includes a payload 868 that contains information regarding the data channel that is used to share tapping information, as well as a timestamp that indicates a time at which keepalive packet 864 was generated.

Although only a few embodiments of the present invention have been described, it should be understood that the present invention may be embodied in many other specific forms without departing from the spirit or the scope of the present invention. By way of example, while a backbone router arrangement is suitable for facilitating communications between top mediation devices, some infrastructures may allow top mediation devices to communicate substantially directly with each other. In a fully meshed network, for instance, top mediation devices may communicate substantially directly with each other. Hence, the present invention may be implemented without a backbone router arrangement.

The functionality implemented by various components in a tiered infrastructure may be implemented as hardware and/or software logic. The logic may include, but is not limited to including, software or program code devices embodied in a tangible, computer readable medium such as a disk, memory, CD-ROM, or a DVD. Such logic, when executed by a processing arrangement, is operable to implement the various methods of the present invention.

While a service provider network has been described as including a single top mediation device, it should be appreciated that a service provider network may generally include any number of top mediation devices. In one embodiment, a service provider network may include a primary top mediation device and a backup top mediation device that is configured to operate when the primary top mediation device is off-line or otherwise unavailable.

The steps associated with the methods of the present invention may vary widely. Steps may be added, removed, altered, combined, and reordered without departing from the spirit of the scope of the present invention. By way of example, if a sender of an inform packet such as a top mediation device fails to receive an ACK packet in response to the inform packet, the top mediation device may contact an appropriate LEA to inform the LEA that the target mobile node may no longer be successfully tapped. Therefore, the present examples are to be considered as illustrative and not restrictive, and the invention is not to be limited to the details given herein, but may be modified within the scope of the appended claims.

What is claimed is:

1. A method comprising:
determining when a node that is tapped by a first mediation device has moved from a first domain associated with the first mediation device into a second domain associated with a second mediation device;
sending a first packet to the second mediation device when it is determined that the node that is tapped by the first mediation device has moved, the first packet being arranged to provide an indication that the second mediation device is to tap the node, wherein sending the first packet to the second mediation device includes a top mediation device sending the first packet to the second mediation device, wherein the top mediation device is arranged to manage the first mediation device and the second mediation device;
opening a call data channel to the second mediation device;

receiving information from the second mediation device on the call data channel, wherein the information is obtained by the second mediation device from the node; and providing the information to the first mediation device.

2. The method of claim 1 wherein determining when the node that is tapped by the first mediation device has moved includes identifying a care-of address (COA) for the node in the second domain associated with the second mediation device.

3. The method of claim 2 wherein the first packet includes the COA, a home address for the node that is associated with the first mediation device, a call content channel identifier of the first mediation device, and a session identifier.

4. The method of claim 1 wherein the first mediation device and the second mediation device are associated with a single service provider network.

5. The method of claim 1 wherein the first mediation device is associated with a first service provider network and the second mediation device is a top mediation device associated with a second service provider network.

6. The method of claim 1 further including:
sending a keepalive message to the second mediation device.

7. The method of claim 1 further including:
receiving an acknowledgement from the second mediation device that the first packet was received, wherein the acknowledgement is received before opening the call data channel.

8. One or more non-transitory, computer-readable media comprising logic for execution by a processing arrangement, the logic, when executed operable to:
determine when a node that is tapped by a first mediation device has moved from a first domain associated with the first mediation device into a second domain associated with a second mediation device;
send a first packet to the second mediation device when it is determined that the node that is tapped by the first mediation device has moved, the first packet being arranged to provide an indication that the second mediation device is to tap the node, wherein the logic operable to send the first packet to the second mediation device is operable to cause a top mediation device to send the first packet to the second mediation device, wherein the top mediation device is arranged to manage the first mediation device and the second mediation device;
open a call data channel to the second mediation device;
receive information from the second mediation device on the call data channel, wherein the information is obtained by the second mediation device from the node; and
provide the information to the first mediation device.

9. The non-transitory computer-readable media of claim 8 wherein the logic operable to determine when the node that is tapped by the first mediation device has moved is further operable to identify a care-of address (COA) for the node in the second domain associated with the second mediation device.

10. The non-transitory computer-readable media of claim 9 wherein the first packet includes the COA, a home address for the node that is associated with the first mediation device, a call content channel identifier of the first mediation device, and a session identifier.

11. The non-transitory computer-readable media of claim 8 wherein the first mediation device and the second mediation device are associated with a single service provider network.

12. The non-transitory computer-readable media of claim 8 wherein the first mediation device is associated with a first service provider network and the second mediation device is a top mediation device associated with a second service provider network.

13. The non-transitory computer-readable media of claim 8 wherein the logic is further operable to:
send a keepalive message to the second mediation device.

14. The non-transitory computer-readable media of claim 8 wherein the logic is further operable to:
receive an acknowledgement from the second mediation device that the first packet was received, wherein the acknowledgement is received before the call data channel is opened.

15. An apparatus comprising:
means for determining when a node that is tapped by a first mediation device has moved from a first domain associated with the first mediation device into a second domain associated with a second mediation device;
means for sending a first packet to the second mediation device when it is determined that the node that is tapped by the first mediation device has moved, the first packet being arranged to provide an indication that the second mediation device is to tap the node, wherein the means for sending the first packet to the second mediation device include means for causing a top mediation device to send the first packet to the second mediation device, wherein the top mediation device is arranged to manage the first mediation device and the second mediation device;
means for opening a call data channel to the second mediation device;
means for receiving information from the second mediation device on the call data channel, wherein the information is obtained by the second mediation device from the node; and
means for providing the information to the first mediation device.

16. The apparatus of claim 15 wherein the means for determining when the node that is tapped by the first mediation device has moved include means for identifying a care-of address (COA) for the node in the second domain associated with the second mediation device.

17. The apparatus of claim 16 wherein the first packet includes the COA, a home address for the node that is associated with the first mediation device, a call content channel identifier of the first mediation device, and a session identifier.

18. The apparatus of claim 15 wherein the first mediation device and the second mediation device are associated with a single service provider network.

19. The apparatus of claim 15 further including:
means for sending a keepalive message to the second mediation device.

20. The apparatus of claim 15 further including:
means for receiving an acknowledgement from the second mediation device that the first packet was received, wherein the acknowledgement is received before opening the call data channel.

21. The method of claim 1 wherein opening the call data channel to the second mediation device includes opening the call data channel from the first mediation device to the second mediation device.

22. The method of claim 21 wherein opening the call data channel from the first mediation device to the second mediation device includes binding a call content channel identifier of the first mediation device to a call content channel identifier of the second mediation device.

\* \* \* \* \*